Dec. 10, 1929.                A. T. BROWN                1,738,984
                          ANTIFRICTION BEARING
                           Filed May 26, 1922

INVENTOR.
Alexander T. Brown
BY
ATTORNEY.

Patented Dec. 10, 1929

1,738,984

UNITED STATES PATENT OFFICE

ALEXANDER T. BROWN, OF SYRACUSE, NEW YORK

ANTIFRICTION BEARING

Application filed May 26, 1922. Serial No. 563,979.

This invention has for its object an antifriction bearing which is particularly simple and economical in construction, readily assembled, and highly efficient and durable in use. It more particularly has for its object a construction by which the retaining ring for the antifriction members is assembled with the race members without riveting, spreading, threading, welding, and similar operations, and without fastening members.

The invention consists in the novel features and in the combinations and constructions hereinafter set forth and claimed.

In describing this invention, reference is had to the accompanying drawings in which like characters designate corresponding parts in all the views.

Figure 1:
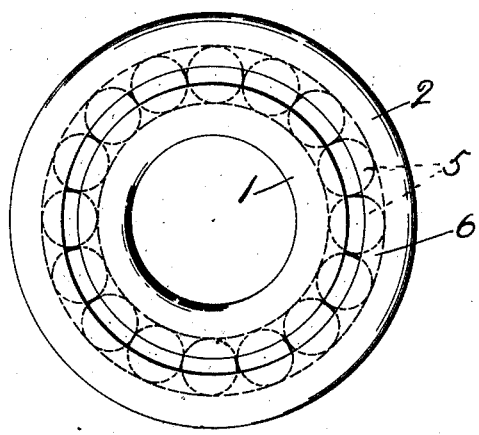
Figure 1 is a side elevation of this bearing.
Figure 2:
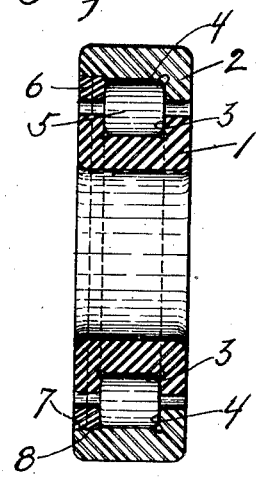
Figure 2 is a vertical cross sectional view.
Figures 3, 4:
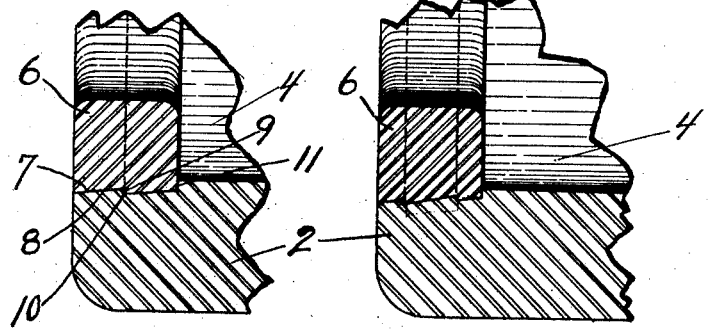
Figure 3 is an enlarged fragmentary sectional view illustrating one form of joint between the retaining ring and the raceway member.
Figure 4 is a view similar to Fig. 3 of a modified form of such joint.

This antifriction bearing comprises inner and outer race members formed with opposing annular channels forming a raceway for the antifriction members as balls or rollers, one of the channels being open at one of its lateral sides, and a retaining ring snugly fitted into engagement with the member formed with the channel which is open at one side to close such open side and held in position without the use of screws or other fastening devices and without riveting, spreading, spinning, threading, welding and similar operations.

1 and 2 designate the inner and outer raceway members formed respectively with opposing channels 3, 4 which form the raceway for the antifriction members 5 which are here illustrated as rollers.

One of the members 1, 2 is formed with one side of its channel open and in the illustrated embodiment of my invention, the one side of the channel 4 of the member 2 is open to permit the members 1, 2 and the rollers 5 to be assembled.

After these parts are assembled the open side is closed by a continuous retaining ring, 6, that is, the ring is not split transversely, the retaining ring being snugly fitted into engagement with the raceway member formed with one side of its channel open and interlocked therewith, opposed or engaged surfaces 7, 8 of the ring and the member being complementally tapered and provided with interlocking shoulders 9, 10, the portions of the taper of the ring toward the outer side of the ring being of larger diameter, the shoulders 9, 10 being provided by forming the tapers with annular steps, the shoulder 10 on the raceway member facing inwardly, and the shoulder 9 on the ring outwardly. The raceway member is also formed with an outwardly facing stop shoulder 11 against which the inner face of the ring abuts.

In operation, after the raceway members and rollers are assembled, the ring 6 is pressed, sprung or shrunk into the member 2, the shoulder 9 snapping or expanding into interlocking engagement with the shoulder 10 of the raceway member.

As the ring 6 is solid or unsplit, the outer raceway member 2 expands outwardly within its elastic limit when the tapered ring is being inserted therein and the ratcheting shoulders 9, 10 hold the ring 6 from outward displacement.

What I claim is:

1. An antifriction bearing comprising inner and outer continuous unsplit members formed with opposing annular channels forming a raceway, one of said channels being open at one of its lateral sides, antifriction members in the raceway and a continuous unsplit retaining ring fitted into engagement with the member with the channel open at one side constituting the closure for the open side of one of the channels, opposing annular faces of said ring and said member being complementally tapered outwardly toward the outer sides of the raceway member and in such direction that the ring is insertable from the outer side of said member, such tapered surfaces being formed with interlocking shoulders arranged to ratchet into engagement with each other as the ring is pressed into position.

2. An antifriction bearing comprising inner and outer continuous unsplit members formed wth opposing annular channels forming a raceway, the channel of the outer member being open at one of its lateral sides, antifriction members in the raceway and a continuous unsplit retaining ring fitted into the open side of the outer member constituting the closure for the open side of one of the channels, the opposing annular faces of said ring and said member being complementally tapered with the portion of the taper of larger diameter toward the outer side of the outer member, such tapered surfaces being formed with ratcheting shoulders arranged to ratchet into engagement with each other as the ring is pressed into the outer member.

3. An antifriction bearing comprising inner and outer continuous unsplit members formed by opposing annular channels forming a raceway, the channel of the outer member being open at one of its lateral sides, antifriction members in the raceway and a retaining ring fitted into the open side of the outer member constituting the closure for the open side of one of the channels, the opposing annular faces of said ring and said member being complementally tapered with the portion of the taper of larger diameter toward the outer side of the outer member, such tapered faces being formed with annular steps constituting annular shoulders, the shoulder of the outer raceway member facing inwardly and the shoulder of the ring facing outwardly.

In testimony whereof, I have hereunto signed my name, at Syracuse, in the county of Onondaga, and State of New York, this 18th day of April, 1922.

ALEXANDER T. BROWN.